(12) United States Patent
Ishii et al.

(10) Patent No.: US 9,108,083 B2
(45) Date of Patent: Aug. 18, 2015

(54) GOLF BALL INCLUDING A BLEND OF HIGHLY NEUTRALIZED ACID POLYMERS AND METHOD OF MANUFACTURE

(75) Inventors: Hideyuki Ishii, Portland, OR (US);
Yasushi Ichikawa, Tualatin, OR (US);
Chien-Hsin Chou, Yun-lin Hsien (TW);
Chen-Tai Liu, Yun-lin Hsien (TW);
Arthur Molinari, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 753 days.

(21) Appl. No.: 13/194,094

(22) Filed: Jul. 29, 2011

(65) Prior Publication Data
US 2013/0029786 A1    Jan. 31, 2013

(51) Int. Cl.
| | |
|---|---|
| A63B 37/04 | (2006.01) |
| A63B 37/06 | (2006.01) |
| C08G 18/48 | (2006.01) |
| C08G 18/76 | (2006.01) |
| A63B 37/00 | (2006.01) |
| C08G 18/67 | (2006.01) |
| C08L 23/08 | (2006.01) |

(Continued)

(52) U.S. Cl.
CPC ......... *A63B 37/0041* (2013.01); *A63B 37/0003* (2013.01); *A63B 37/0031* (2013.01); *A63B 37/0037* (2013.01); *A63B 37/0043* (2013.01); *A63B 37/0045* (2013.01); *A63B 37/0059* (2013.01); *A63B 37/0062* (2013.01); *A63B 37/0063* (2013.01); *A63B 37/0064* (2013.01); *A63B 37/0066* (2013.01); *A63B 37/0074* (2013.01); *A63B 37/0075* (2013.01); *A63B 37/0076* (2013.01); *A63B 37/0082* (2013.01); *A63B 37/0092* (2013.01); *C08G 18/4854* (2013.01); *C08G 18/6674* (2013.01); *C08G 18/67* (2013.01); *C08G 18/7671* (2013.01); *C08G 18/86* (2013.01); *C08L 23/0876* (2013.01); *A63B 37/005* (2013.01); *A63B 37/0039* (2013.01); *A63B 37/0058* (2013.01)

(58) Field of Classification Search
None
See application file for complete search history.

(56) References Cited

U.S. PATENT DOCUMENTS

| | | | |
|---|---|---|---|
| 5,409,974 A | 4/1995 | Sullivan et al. | |
| 5,691,418 A * | 11/1997 | Hagman et al. | 525/196 |
| 6,071,201 A * | 6/2000 | Maruko | 473/373 |

(Continued)

OTHER PUBLICATIONS

International Search Report and Written Opinion in PCT Application No. PCT/US2012/046701, mailed on Feb. 15, 2013.

(Continued)

*Primary Examiner* — John E Simms, Jr.
(74) *Attorney, Agent, or Firm* — Honigman Miller Schwartz and Cohn LLP; Anna M. Budde; Jonathan P. O'Brien

(57) ABSTRACT

A golf ball having an inner core layer, an outer core layer enclosing the inner core layer, and a cover layer enclosing the outer core layer. The inner core layer includes a blend of a first highly neutralized acid polymer having a first Vicat softening temperature and a first specific gravity, a second highly neutralized acid polymer having a second Vicat softening temperature and a second specific gravity, and an ionomer-based masterbatch comprising an additive and an ionomer resin having a third Vicat softening temperature and a third specific gravity. The absolute values of the differences among the Vicat softening temperatures is no more than about 15° C. and the absolute value of the difference between the specific gravities is no more than about 0.015. The cover layer may include an inner cover layer enclosing the outer core layer and an outer layer enclosing the inner cover layer.

20 Claims, 1 Drawing Sheet

(51) Int. Cl.
*C08G 18/86* (2006.01)
*C08G 18/66* (2006.01)

(56) References Cited

U.S. PATENT DOCUMENTS

| | | | |
|---|---|---|---|
| 7,041,721 B2 | 5/2006 | Rajagopalan et al. | |
| 7,160,954 B2 | 1/2007 | Zieske et al. | |
| 2002/0039933 A1* | 4/2002 | Nakamura et al. | 473/361 |
| 2004/0077799 A1 | 4/2004 | Rajagopalan et al. | |
| 2005/0261084 A1 | 11/2005 | Sullivan et al. | |
| 2005/0261424 A1 | 11/2005 | Snell et al. | |
| 2006/0166761 A1* | 7/2006 | Kim et al. | 473/371 |
| 2006/0189413 A1 | 8/2006 | Boehm et al. | |
| 2007/0203277 A1 | 8/2007 | Chen | |
| 2008/0171617 A1* | 7/2008 | Boehm et al. | 473/374 |
| 2008/0220906 A1 | 9/2008 | Sullivan et al. | |
| 2008/0274825 A1* | 11/2008 | Kim et al. | 473/372 |
| 2008/0274832 A1 | 11/2008 | Comeau et al. | |
| 2009/0209368 A1* | 8/2009 | Kasashima et al. | 473/374 |
| 2009/0215554 A1* | 8/2009 | Cheng et al. | 473/376 |
| 2010/0179001 A1 | 7/2010 | Cheng et al. | |
| 2011/0143863 A1 | 6/2011 | Sullivan et al. | |
| 2012/0077621 A1 | 3/2012 | Ishii et al. | |

OTHER PUBLICATIONS

International Search Report and Written Opinion in PCT Application No. PCT/US2012/046708, mailed on Feb. 15, 2013.
International Search Report and Written Opinion in PCT Application No. PCT/US2012/046695, mailed on Feb. 15, 2013.
Second Office Action in Chinese Utility Model Patent Application No. 201220370708.2, issued on Mar. 6, 2013.

* cited by examiner

GOLF BALL INCLUDING A BLEND OF HIGHLY NEUTRALIZED ACID POLYMERS AND METHOD OF MANUFACTURE

BACKGROUND OF THE INVENTION

1. Field of the Invention

The present invention relates to a golf ball including a blend of highly neutralized acid polymers. The invention also relates to a golf ball including a blend of highly neutralized acid polymers with additives in an ionomer-based masterbatch. The invention also relates to a method of manufacturing products, particularly golf balls, including a blend of highly neutralized acid polymers and an ionomer-based masterbatch containing additives, and to a method for making the blend.

2. Description of Related Art

Golf balls are important sporting goods that have changed with changes in technology. For example, balls were first made of wood, and then by stuffing boiled, softened feathers into a leather sack. The sack typically was painted white, and would tighten upon drying. However, because the feather ball tended to absorb moisture and to split, many balls were required to play a round. Also, these feather balls were expensive as compared with wooden balls.

Both feather and wooden balls were in use until the gutta percha ball was made. The gutta percha ball was relatively inexpensive and easily manufactured. Also, the gutta percha ball was fairly durable, as compared with the feather ball, performed well because the surface could easily be roughened to improve flight characteristics, and so became popular. However, the ball exhibited a tendency to break up in flight.

Golf balls comprising other elastic materials then were developed. For example, a golf ball having a rubber core and an elastic thread wound tightly around the core was developed. The winding was covered with gutta percha at first, but later with balata. However, balata-covered golf balls often are damaged by players who are less skilled at striking the ball. Thus, tougher covers were developed, including in particular covers comprising a Surlyn® compound or a polyurethane compound.

The interior structure of the golf ball also has advanced, with plastics and polymeric materials having properties and characteristics appropriate for manufacture of high-quality, high-performance, affordable golf balls. In particular, polymeric materials having properties and characteristics appropriate for golf ball manufacture have been developed. Such polymeric materials include polyurethanes and ionomeric materials, including highly neutralized acid polymers. Blended materials also are used to manufacture other products.

Blends of materials polymeric often contain other compositions, typically called additives, that adjust properties and characteristics of golf balls and other products to achieve properties and characteristics that may not be available from a single material or from the polymers alone. However, many material blends that manufacturers seek to make are difficult, if not impossible, to make successfully because the components are not compatible or are not easily combined. In particular, highly neutralized acid polymers typically are difficult to blend, and some additives do not blend easily with highly neutralized acid polymers.

Therefore, there exists a need for a golf ball comprising a layer having properties and characteristics obtained by blending polymeric materials with additive compositions. Further, there exists a need for method of manufacturing products, particularly golf balls, including a blend of highly neutralized acid polymers and additives that are difficult to combine with highly neutralized acid polymers, and for a method for blending highly neutralized acid polymers with such additives.

SUMMARY OF THE INVENTION

In an aspect, the invention relates to a golf ball comprising a blend of highly neutralized acid polymers. In particular, the blend comprises an ionomer-based masterbatch. A golf ball layer includes a blend of a first highly neutralized acid polymer having a first Vicat softening temperature and a first specific gravity, a second highly neutralized acid polymer having a second Vicat softening temperature and a second specific gravity, and an ionomer-based masterbatch comprising an additive and an ionomer resin having a third Vicat softening temperature. The absolute values of the differences among the Vicat softening temperatures is no more than about 15° C. and the absolute value of the difference between the specific gravities is no more than about 0.015.

In another aspect, the invention relates to a method of manufacturing a product, particularly a golf ball, comprising a blend of highly neutralized acid polymers. In particular, the invention relates to a method of manufacturing a golf ball comprising a blend of highly neutralized acid polymers and an ionomer-based masterbatch, and to a method of making the blend, which method includes blending highly neutralized acid polymers with the ionomer-based masterbatch comprising additives, controlling the differences in softening temperatures of the highly neutralized acid polymer and ionomer components of the blend, and controlling the difference in specific gravities of the highly neutralized acid polymers.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
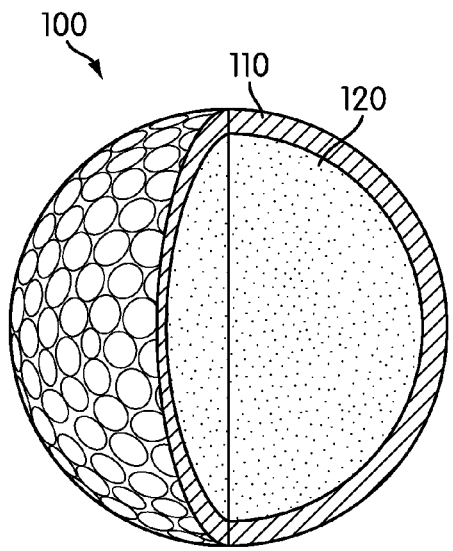
FIG. 1 shows a representative golf ball in accordance with this disclosure having a two-piece construction comprising a core layer and a cover layer.

Generally, the invention relates to a golf ball including a blend of highly neutralized acid polymers and additives. The invention relates to a golf ball comprising a blend of highly neutralized acid polymers. In particular, the blend comprises an ionomer-based masterbatch. A golf ball layer includes a blend of a first highly neutralized acid polymer having a first Vicat softening temperature and a first specific gravity, a second highly neutralized acid polymer having a second Vicat softening temperature and a second specific gravity, and an ionomer-based masterbatch comprising an additive and an ionomer resin having a third Vicat softening temperature and a third specific gravity. The absolute values of the differences among the Vicat softening temperatures is no more than about 15° C. and the absolute values of the differences among the specific gravities are no more than about 0.015.

The invention also relates to a method of manufacturing a golf ball comprising a blend of highly neutralized acid polymers and additives by introducing additives that are difficult to blend with highly neutralized acid polymer as part of the masterbatch, controlling the differences in Vicat softening temperatures of the highly neutralized acid polymers and ionomer resin of the blend, and controlling the differences in specific gravities of the highly neutralized acid polymers and ionomer resin of the blend, and to the method of making the blend.

Blending highly neutralized acid polymers can be difficult. The properties and characteristics of ionic polymers such as highly neutralized acid polymers can cause difficulty in blending. The skilled practitioner recognizes that highly neutralized acid polymers act like cross-linked polymers because the neutralized carboxylate moieties, i.e., the polar parts of the molecule, tend to cluster together in the otherwise non-polar polymer. However, the clusters tend to separate when heated, thus causing the compound to soften like a thermoplastic material and to provide an opportunity to process the heated material.

Thus, to form a blend, the compounds that make up a blend of highly neutralized acid polymers typically will be heated to take advantage of the resultant thermoplasticity. However, the compounds often will remain difficult to blend, because the component polymers often do not soften under the same conditions and thus will be difficult to process.

Controlling the differences between the Vicat softening temperatures and the specific gravities of the highly neutralized acid polymers forming the blend ameliorates processing problems encountered when blending the materials and yields an essentially homogeneous blend. These processing problems include formation of gas from a polymer that has a lower melting temperature than the melting temperature of the other polymers in the blend and stratification of molten material. Gas may be formed if a highly neutralized acid polymer is over-heated to the higher softening temperature required by the other components of the blend. Formation of gas during processing causes voids in the processed product. A difference in specific gravities makes it difficult to control the mixing ratio, leading to stratification and heterogeneity in a product. Stratification and heterogeneity in the molded product also is a defect in the processed product. These and other defects in products are reduced when the differences between Vicat softening temperatures and specific gravities of highly neutralized acid polymers are controlled.

However, the inventors have discovered that controlling only these parameters may not ensure that a quality product, such as a golf ball, will result. For example, a manufacturer may seek to introduce an additive. As the skilled practitioner recognizes, many such additives compositions, such as brighteners, colors, and fillers, typically are added to polymer products. However, many of these additives do not blend easily with highly neutralized acid polymers. Further, moisture adsorbed by the highly neutralized acid polymers complicates processing.

The inventors have discovered that additives can be effectively introduced into highly neutralized acid polymer, including blends of highly neutralized acid polymers, by incorporating a masterbatch containing the additives. The masterbatch comprises an ionomeric polymer that is compatible with both the additives and the highly neutralized acid polymers. Further, ionomers not only do not adsorb as much moisture as highly neutralized acid polymers, but also dry more easily than highly neutralized acid polymers.

The inventors also have discovered that controlling the Vicat softening temperatures and the specific gravities of the highly neutralized acid polymers and the ionomer resin, and incorporating additives as part of an ionomer-based masterbatch, not only yields excellent product quality but also simplifies processing.

The skilled practitioner recognizes that thermoplastic material can be processed in many ways, and typically is processed by injection molding or compression molding. Injection molding is a process typically used in the manufacture of golf balls. Successful injection molding requires that the composition being molded be flowable to fill a mold. Thus, formation of gas during injection will disrupt the process and may damage the mold and other processing equipment, in addition to causing defects in the product. Similarly, molding heterogeneous material may cause distribution problems in the mold and poor product quality due to problems in controlling the mixing ratio.

In an embodiment of the invention, the Vicat softening temperatures of the polymeric components being blended are controlled so that the differences between the temperatures are within ranges that make processing of the blend easy and result in high quality processed products. The specific gravities of the highly neutralized acid polymers also are controlled. Also, a masterbatch comprising an ionomeric polymer and additives that are difficult to blend with highly neutralized acid polymers is used to facilitate formation of the blend, to reduce introduction of additional moisture into the product, and to make it easier to remove moisture that is present.

For convenience, embodiments of the invention will be described with detail as they relate to blends having 2 highly neutralized acid polymer components in the manufacture of golf balls. However, the invention relates to ternary, quaternary, and higher order highly neutralized acid polymer blends and any product comprising highly neutralized acid polymers. With the description provided herein, the skilled practitioner will be able to apply the subject matter of the invention to blends of any number of highly neutralized acid polymer components and the manufacture of products therewith.

The drawing figures illustrate selected golf ball constructions. FIG. 1 shows a golf ball 100 in accordance with a first embodiment of the present disclosure. Golf ball 100 is a two-piece golf ball. Specifically, golf ball 100 includes cover layer 110 substantially surrounding core layer 120. In golf ball 100, core layer 120 may be made of a blend of highly neutralized acid polymers.

Figure 2:
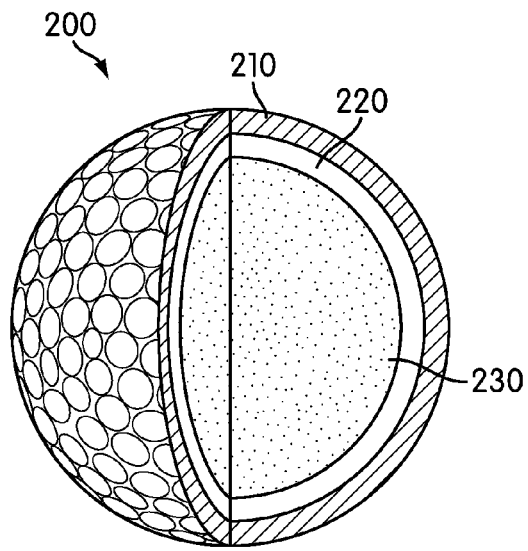
FIG. 2 shows a second representative golf ball in accordance with this disclosure having a three-piece construction comprising a core layer, an inner cover layer, and an outer cover layer.

FIG. 2 shows a golf ball 200 in accordance with a second embodiment of the present disclosure. Golf ball 200 includes a core layer 230, an inner cover layer 220 substantially surrounding core layer 230, and an outer cover layer 210 substantially surrounding inner cover layer 220. In some embodiments, both inner cover layer 220 and core layer 230 may comprise the blended highly neutralized acid polymers described herein.

Figure 3:
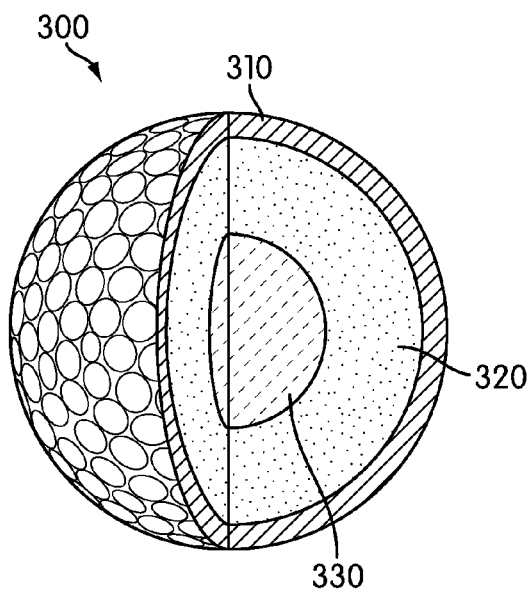
FIG. 3 shows a third representative golf ball in accordance with this disclosure having a three-piece construction comprising an inner core layer, an outer core layer, and a cover layer.

FIG. 3 shows a golf ball 300 in accordance with a third embodiment of the present disclosure. Golf ball 300 includes an inner core layer 330, an outer core layer 320 substantially surrounding inner core layer 330, and a cover layer 310 substantially surrounding outer core layer 320. In some embodiments, inner core layer 330 and outer core layer 320 may comprise blended highly neutralized acid polymers.

Figure 4:
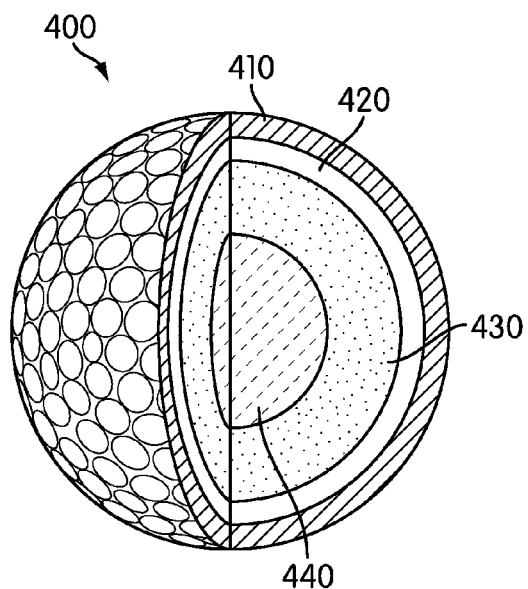
FIG. 4 shows a fourth representative golf ball in accordance with this disclosure having a four piece construction comprising an inner core layer, an outer core layer, an inner cover layer, and an outer cover layer.

FIG. 4 shows a golf ball 400 in accordance with a fourth embodiment of the present disclosure. Golf ball 400 includes an inner core layer 440, an outer core layer 430 substantially surrounding inner core layer 440, an inner cover layer 420 substantially surrounding outer core layer 430, and an outer cover layer 410 substantially surrounding inner cover layer 420. In some embodiments, any or all of inner cover layer 420, outer core layer 430, and inner core layer 440 can comprise blended highly neutralized acid polymers.

In some embodiments, a cover layer comprises an inner cover layer 420 essentially enclosing an outer core layer 420 and an outer cover layer 410 essentially enclosing the inner cover layer.

Thus, each of these types of golf balls can be made in accordance with the method disclosed herein. Also, golf balls with additional layers, such as 5 or more layers, can be made in accordance with the method disclosed herein. Except as otherwise discussed herein below, any golf ball discussed herein may generally be any type of golf ball known in the art. Namely, unless the present disclosure indicates to the contrary, a golf ball may generally be of any construction conventionally used for golf balls, such as a regulation or non-regulation construction. Regulation golf balls are golf balls which meet the Rules of Golf as approved by the United States Golf Association (USGA). Golf balls discussed herein may also be made of any of the various materials known to be used in golf ball manufacturing, except as otherwise noted.

Furthermore, it is understood that any feature disclosed herein (including but not limited to various embodiments shown in the FIGS. and various chemical formulas or mixtures) may be combined with any other features disclosed here, as may be desired.

The skilled practitioner recognizes that additives often are added to a golf ball layer to modify the properties and characteristics of that layer. In particular, fillers often are used to increase the specific gravity or hardness of a layer. Fillers can be organic compounds, but typically are inorganic compounds. Typical inorganic fillers include metals, particularly in powder form, and metal oxides, sulfates, carbonates, and other forms. However, these inorganic fillers typically are difficult to blend with highly neutralized acid polymers. Thus, the difficulty in forming blended highly neutralized acid polymers, combined with the difficulty in incorporating some additives, makes the manufacture of products, such as golf balls, a challenging process.

Further, highly neutralized acid polymers are hygroscopic. Moisture adsorbed by the highly neutralized acid polymers forms voids during processing, for example, during injection molding or compression molding to form a golf ball layer.

One approach to ameliorating the difficulty of incorporating fillers, for example, into highly neutralized acid polymers is to form a masterbatch. The skilled practitioner recognizes that masterbatching herein would be expected to involve formation of a composition comprising a high concentration of additive in a small portion of highly neutralized acid polymer. The masterbatch then would be blended into the product.

Masterbatching requires heating the highly neutralized acid polymer, blending the components, cooling, and comminuting the product. The masterbatch material must be comminuted for further processing, often in a granulator after an extruder. However, the result of comminution typically is unsatisfactory. Although air-cooled granulators are available, they are not favored in the art, so a water-cooled granulator typically is used. The highly neutralized acid polymers thus adsorb water, which water is not easily removed before further processing. Moisture in the resin during injection will form voids in the product and the escaping vapor may damage equipment. Thus, masterbatching with highly neutralized acid polymer is not a suitable alternative.

However, the inventors have discovered that a masterbatch of additives in an ionomer resin provides a suitably easy and cost-effective way of producing these desirable products. Because ionomer resin does not adsorb moisture as highly neutralized acid polymer does, water-cooled granulation can be used, with any moisture adsorbed easily removed before further processing.

In accordance with the invention, a first highly neutralized acid polymer has a first Vicat softening temperature and a first specific gravity, a second highly neutralized acid polymer has a second Vicat softening temperature and a second specific gravity, and an ionomer resin has a third Vicat softening temperature and a third specific gravity. The inventors have discovered that blending of these two highly neutralized acid polymers and the ionomer resin is facilitated if the differences among the first, second, and third Vicat softening temperatures are controlled within predetermined values, and typically are minimized. Thus, in an embodiment of the invention, the absolute values of the differences among Vicat softening temperatures of highly neutralized acid polymers and ionomer resin to be blended are limited to about 15° C. or less, typically about 10° C. or less, and more typically about 8° C. or less. In other embodiments, the absolute values of the differences among the first Vicat softening temperature, the second Vicat softening temperature, and the third Vicat softening temperature are about 5° C. or less, more typically about 2° C. or less, and even more typically about 1° C. or less.

In another aspect, the absolute values of the differences among the specific gravities of the highly neutralized acid polymers and the ionomer resin to be blended are controlled within predetermined values, and typically are minimized. In an embodiment, the absolute value of the difference in specific gravities is limited to no more than about 0.015, typically no more than about 0.010, and more typically no more than about 0.005.

In a more typical embodiment, both the differences in Vicat softening temperatures and the differences in specific gravities are controlled. In embodiments, the differences can be individually limited to any of the ranges associated with that difference. Thus, the absolute values of the differences in Vicat softening temperatures are limited to about 15° C. or less, and the absolute values of the differences in specific gravities is limited to no more than about 0.015, typically no more than about 0.010, and more typically no more than about 0.005. Similarly, the absolute values of the differences in Vicat softening temperature are limited to about 10° C. or less, typically about 8° C. or less, more typically is about 5° C. or less, still more typically about 2° C. or less, and even more typically about 1° C. or less, while the absolute values of the differences in specific gravities are limited to no more than about 0.015, typically no more than about 0.010, and more typically no more than about 0.005.

Products comprising blends of highly neutralized acid polymers containing additives can be made with fewer defects in accordance with the invention by injection molding, compression molding, or processing the blend in accordance with any suitable manner for processing thermoplastic materials, by controlling the Vicat softening temperatures and specific gravities, as described herein, and by introducing the additives as part of an ionomer-based masterbatch. In particular, golf balls often are made, at least in part, by injection molding of thermoplastic materials. Thus, a method of making golf balls can benefit from the method of controlling the Vicat softening temperatures and specific gravities of the materials to be blended, and by introducing additives as part of an ionomer-based masterbatch.

Thus, an embodiment of the invention is directed to a method of manufacturing a golf ball including a blend of highly neutralized acid polymers and an ionomer resin by controlling the differences among Vicat softening temperatures of the highly neutralized acid polymers and the ionomer resin to be blended, controlling the differences among the specific gravities of the highly neutralized acid polymers and the ionomer resin, introducing additives as part of an ionomer-based masterbatch, and processing the blended material to form at least a part of a golf ball.

In an embodiment, highly neutralized acid polymers and ionomer resin often used in a blend of highly neutralized acid polymers used in the manufacture of golf balls have a Vicat softening temperature of between about 30° C. and about 70° C., typically between about 40° C. and about 65° C., and more typically between about 48° C. and about 65° C.

Highly neutralized acid polymers are copolymers or terpolymers with a fatty acid salt. In embodiments of the invention, the ionomer resin used to form the ionomer-based masterbatch is different from the copolymer or terpolymer present in any of the highly neutralized acid polymers forming the blend. Ionomer resins can be distinguished from highly neutralized acid polymers by both structural differences and differences in properties and characteristics. Structurally, ionomer resins are co-polymers devoid of fatty acid salt, whereas highly neutralized acid polymers are co-polymers and terpolymers with a fatty acid salt. Whereas salts, hydroxides, carbonates, and other metal-containing compounds are used to provide some neutralizing ions in both ionomer resins and highly neutralized acid polymers, fatty acid salts also are used in highly neutralized acid polymers. Thus, the structures of an ionomer resin and of a highly neutralized acid polymer are distinct. The properties and characteristics of these compounds also are distinct. Ionomer resin is not hygroscopic, but highly neutralized acid polymer is hygroscopic, typically because of the presence of the fatty acid salt. With the information and guidance provided herein, the skilled practitioner will be able to identify ionomer resins and highly neutralized acid polymers.

As described herein, the specific gravities of the highly neutralized acid polymers and the ionomer resin are controlled in embodiments of the invention. In some embodiments of the invention, the ionomer-based masterbatch comprises filler, typically densifier, as an additive. Typically, therefore, in embodiments of the invention, the specific gravity of the inorganic filler is greater than the specific gravity of any polymer (i.e., the highly neutralized acid polymers and the ionomer resin). In other embodiments, the specific gravity of the inorganic filler is greater than the sum of the specific gravities of the polymers.

Typically, embodiments are directed to golf balls having core layers comprising blended highly neutralized acid polymers. More typically, the inner core layer of a golf ball comprises blended highly neutralized acid polymers. In particular, the core layer, or inner core layer, is made by injection molding. For convenience, embodiments of the invention will be described with particularity herein as they relate to manufacturing the core layer or the inner core layer of a 3-piece or -layer golf ball or a 4-piece golf ball. However, with the information and guidance provided herein, the skilled practitioner will be able to design balls having more or different layers.

An embodiment is directed to a 3-piece golf ball having a core layer 230 or an inner core layer 330, an inner cover layer 220 or an outer core layer 320 substantially enclosing the respective inner layer, and outer cover layer 210 or cover layer 310 substantially enclosing their respective inner layers.

Another embodiment is directed to a four-piece golf ball comprising an inner core layer 440; an outer core layer 430 substantially enclosing the inner core layer; an intermediate or inner cover layer 420 substantially enclosing the outer core layer, and an outer cover layer 410 substantially enclosing the inner cover layer.

Typically, in these 3- and 4-piece ball constructions that are embodiments of the invention, the core layer or inner core layer comprises a blend comprising a first highly neutralized acid polymer having a first Vicat softening temperature of from about 48° C. to about 65° C., a second highly neutralized acid polymer having a second Vicat softening temperature of from about 48° C. to about 65° C., and an ionomer-based masterbatch comprising additives and an ionomer resin having a third Vicat softening temperature of from about 48° C. to about 65° C., and the absolute values of the differences among the first, second, and third Vicat softening temperatures and the ionomer resin are controlled to no more than about 15° C.

In another typical embodiment, the inner core layer comprises a blend comprising a first highly neutralized acid polymer having a first specific gravity and a first Vicat softening temperature, a second highly neutralized acid polymer having a second specific gravity and a second Vicat softening temperature, and an ionomer-based masterbatch comprising additives and an ionomer resin having a third Vicat softening temperature and a third specific gravity, and the absolute values of the differences among the first, second, and third Vicat softening temperatures and the absolute values of the differences among the first, second, and third specific gravities are controlled within predetermined values, thus facilitating forming a thermoplastic inner core layer comprising a blend of highly neutralized acid polymers. More typically, the absolute values of the differences among Vicat softening temperatures is no more than about 15° C., and the absolute values of the differences among specific gravities is no more than about 0.015. Even more typically, for the first and second highly neutralized acid polymers, the absolute values of the difference between the first Vicat softening temperature and second Vicat softening temperature is less than about 5° C.

Often, an inner core layer of an embodiment of the invention has a specific gravity between about 0.85 to about 1.1, typically between about 0.9 and about 1.1. In embodiments, the specific gravity is adjusted to adjust the moment of inertia (MOI) to affect the spin rate of the ball. Lowering the specific gravity of the inner core layer to a value less than about the specific gravities of the outer layers will increase the MOI and reduce the spin rate. Alternatively, increasing the specific gravity of the inner core layer decreases the MOI and increases the spin rate. With the information and guidance provided herein, the skilled practitioner can select a specific gravity of the blend to provide a desired MOI and can control the specific gravities of the highly neutralized acid polymers in the blend to form a homogeneous blend that forms a defect-free product.

In embodiments, a thick thermoset outer core layer often is used to protect the thermoplastic inner core layer. The thickness of the outer core layer typically is between about 5 mm and about 9 mm. Also, to have good flight performance, the outer core layer, with the inner core layer therein, has a high coefficient of restitution (COR). Typically, the COR is at least about 0.8. To have a good spin rate of mid or short iron shots, the outer cover layer has a low flexural modulus, typically less than about 1,000 psi. Embodiments of the invention also include 4-piece golf balls in which the inner cover layer has a high Shore D hardness, typically at least about 60, to reduce the spin rate of driver shots. In particular, to have a good moment of inertia, the inner cover layer has a greater specific gravity than the thermoset outer core layer. Embodiments of the invention also include a cross-linked thermoplastic having a flexural modulus of less than about 1,000 psi to provide good spin rate for mid- and short-iron shots.

As used herein, unless otherwise noted, Vicat softening temperature, compression deformation, hardness, COR, and flexural modulus, are measured as follows:

Vicat softening temperature: Measured in accordance with ASTM D-1525.

Compression deformation: The compression deformation herein indicates the deformation amount of a golf ball, or part thereof, under a force. Specifically, when the force is increased to 130 kg from 10 kg, the deformation amount of the golf ball or part thereof under a force of 130 kg, less the deformation amount of the golf ball or part thereof under a force of 10 kg, is the compression deformation value. For example, a golf ball that deforms 0.5 mm under a 10 kg force and 5.0 mm under a 130 kg force has a compression deformation of 4.5 mm.

Hardness: Hardness of golf ball layer is measured generally in accordance with ASTM D-2240, but is measured on the land area of a curved surface of a molded golf ball.

Method of measuring COR: A golf ball is fired by an air cannon at a steel plate positioned about 1.2 meters away from the air cannon at an initial velocity of 40 m/sec. A speed monitoring device is located over a distance of 0.6 to 0.9 meters from the cannon. After striking the plate, the golf ball rebounds through the speed-monitoring device. The return velocity divided by the initial velocity is the COR.

Flexural modulus: Measured in accordance with ASTM D-790.

In embodiments in which the inner core layer 440 has a high resilience, the golf ball 400 will have a good flight performance. In embodiments of the invention, therefore, outer core layer 430 with inner core layer 440 in it typically has a COR value from at least about 0.80, more typically at least about 0.81, and more typically at least about 0.82. In some embodiments, inner core layer 440 has a first coefficient of restitution, golf ball 400 has a second coefficient of restitution, and the first coefficient of restitution is greater than the second coefficient of restitution. Typically, the first coefficient of restitution is at least about 0.01 greater than the second coefficient of restitution.

Inner core layer 440 typically is made by an injection molding process, although a compression molding process may also be used. During an injection molding process, the temperature of the injection machine typically is set in a range of about 190° C. to about 220° C.

However, before the injection molding process, first and second highly neutralized acid polymers, a blend thereof, the ionomer resin, and the ionomer-based masterbatch, should be kept in a moisture-resistant packaging or should be treated with a dry gas, typically air, to reduce the moisture level. Moisture in the compounds will cause voids in the product. Drying conditions for highly neutralized acid polymers typically require 2 to 24 hours of dry air flow at a temperature below about 50° C. Because the ionomer resin does not adsorb as much moisture as does highly neutralized acid polymer, drying conditions for ionomer resins are less severe, and drying may not be necessary if the moisture content of the ionomer resin in the ionomer-based masterbatch is not too high. Moisture levels greater than 2,000 ppm in the highly neutralized acid polymer may make it necessary to employ vacuum as well as heat to remove moisture therefrom. The moisture level should be no more than about 1,000 ppm for production of products free from defects caused by moisture.

After drying, if necessary, the highly neutralized acid polymers and the ionomer-based masterbatch may be dry-blended or be compounded in an extruder, for example, preparatory to injection molding to form a product, herein typically the inner core layer of a golf ball. Although compounding produces a more intimate mixture and helps ensure homogeneity of product, dry blending is sufficient. The blend then is further processed in, for example, an injection molding process, to form a product, such as a layer of a golf ball.

Any ratio of components can be blended. In one embodiment, the concentration range of the first highly neutralized acid polymer is between about 10 wt percent to about 70 wt percent, based on the weight of the blended product; the second highly neutralized acid polymer is present at about 10 wt percent to about 70 wt percent, based on the weight of the blended product; and the concentration of ionomer-based masterbatch is between about 1 wt percent and about 30 wt percent, based on the weight of the blended product. In another embodiment, the highly neutralized acid polymers are present in an independently selected concentration of between about 20 wt percent to about 60 wt percent each, and the concentration of the ionomer-based masterbatch is between about 10 and about 25 wt percent.

In embodiments of the invention, suitable highly neutralized acid polymers include, but are not limited to, HPF resins such as HPF1000, HPF2000, HPF AD1024, HPF AD1027, HPF AD1030, HPF AD1035, HPF AD1040, all produced by E. I. Dupont de Nemours and Company. In embodiments, core layer 440 comprises a blend of highly neutralized acid polymers and optionally additives, fillers, and/or melt flow modifiers. The acid polymer typically is neutralized to 80 percent or higher, including up to 100 percent, with a suitable cation source, such as magnesium, sodium, zinc, or potassium. The cation source of first and second highly neutralized acid polymers may be the same or different.

The masterbatch comprises an ionomer resin and an inorganic filler. Suitable ionomer resin in embodiments of the invention has a Vicat softening temperature of from about 48° C. to 65° C., such as Surlyn® 6910, Surlyn® 9910, Surlyn® 8920, Surlyn® 7940, Surlyn® 8940, Surlyn® 8941, Surlyn® 6120, Surlyn® 8140, Surlyn® 8150, Surlyn® 9150, Surlyn® 8120, Surlyn® 9020, Surlyn® 6320, Surlyn® 9320, and Surlyn® 9320W, or Iotek® (products available from ExxonMobil Chemical Company) of similar Vicat softening temperature. Suitable inorganic fillers include, but are not limited to, zinc oxide, titanium dioxide, tin oxide, calcium oxide, magnesium oxide, barium sulfate, zinc sulfate, zinc carbonate, barium carbonate, and metal powder such as tungsten powder, and molybdenum powder. Other suitable inorganic fillers include mica, talc, clay, silica, lead silicate, and the like.

In embodiments of the invention, the inorganic filler has a specific gravity greater than the specific gravities of the first and second highly neutralized acid polymers and of the ionomer resin. Typically, the specific gravity of the filler is greater than the sum of the first, second, and third specific gravities. It is typical that the inorganic filler of the masterbatch has a density of more than 3 g/cm³ to impart a greater specific gravity in the layer.

Typically, the weight fraction of the inorganic filler in the masterbatch is greater than the fraction of the ionomer resin. In embodiments of the invention, the weight fraction of the ionomer resin can be from about 10 wt percent to about 45 wt percent of the ionomer-based masterbatch. Accordingly, the weight fraction of the inorganic filler can be from about 90 wt percent to about 55 wt percent of the ionomer-based masterbatch.

To add color of inner core layer 440, the masterbatch may optionally include a color agent. Typically, color agent comprises less than about 1 wt percent of the ionomer-based masterbatch.

In addition to filler, other additives may be incorporated into the blend. Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants, and regrind, i.e., core material that is ground and recycled. These other additives can be added as part of the ionomer-based masterbatch or, more typically, are incorporated directly into the highly neutralized acid polymer.

Suitable melt flow modifiers include, for example, fatty acids and salts thereof, polyamides, polyesters, polyacrylates, polyurethanes, polyethers, polyureas, polyhydric alcohols, and combinations thereof.

Each of the compounds discussed herein for any particular embodiment may be mixed and matched with any other specific embodiment of another compound according to the description herein. Furthermore, any compound may generally be used in combination with other compounds of the same type, such that any list herein includes mixtures thereof, unless otherwise specified.

In embodiments of the invention, the diameter of inner core layer 440 may be in a range of from about 21 mm to about 28 mm, or from about 24 mm to about 28 mm.

Inner core layer 440 typically has a compression deformation value in a range of from about 3 mm to about 5 mm. In some embodiments, inner core layer 440 has a compression deformation value in a range of from about 3 mm to about 4.5 mm. Further, inner core layer 440 has a surface Shore D hardness of from 45 to 55 at any single point on a cross-section obtained by cutting inner core layer 440 in half, and has a Shore D cross-sectional hardness difference between any two points on the cross-section of within ±6. This hardness condition ensures that the golf ball will exhibit stable performance. In some embodiments, the hardness difference between any two points on the cross-section is within ±3.

Outer core layer 320 or 430 typically is formed of thermoset materials, typically by crosslinking a polybutadiene rubber composition. When other rubber is used in combination with a polybutadiene, it is typical that polybutadiene is included as a principal component. Specifically, a proportion of polybutadiene in the entire base rubber typically is equal to or greater than about 50 percent by weight, and more typically is equal to or greater than about 80 percent by weight. A polybutadiene having a proportion of cis-1,4 bonds of equal to or greater than about 60 mol percent, and further, equal to or greater than about 80 mol percent, is most typical.

In some embodiments, cis-1,4-polybutadiene may be used as the base rubber and mixed with other ingredients. In some embodiments, the amount of cis-1,4-polybutadiene may be at least about 50 parts by weight, based on 100 parts by weight of the rubber compound.

Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties.

The filler may be used to increase the specific gravity of the rubber compound. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity. In some embodiments, the specific gravity of outer core layer 320 or 430 may be from about 1.05 to about 1.45. In some embodiments, the specific gravity of outer core layer 320 or 430 may be from about 1.05 to about 1.35.

In some embodiments, a polybutadiene synthesized using a rare earth element catalyst may be used. In some embodiments, rare earth element catalysis of the polybutadiene reaction is typical. Excellent resilience performance of a golf ball may be achieved by using this polybutadiene. Examples of rare earth element catalysts include lanthanum series rare earth element compounds. Other catalysts may include an organoaluminum compound, an alumoxane, and halogen containing compounds. A lanthanum series rare earth element compound is typical. Polybutadiene obtained by using lanthanum series rare earth-based catalysts usually employs a combination of lanthanum series rare earth (atomic number of 57 to 71) compounds, but particularly typical is a neodymium compound.

In some embodiments, the polybutadiene rubber composition may comprise at least from about 0.5 parts by weight to about 5 parts by weight of a halogenated organosulfur compound. In some embodiments, the polybutadiene rubber composition may comprise at least from about 1 part by weight to about 4 parts by weight of a halogenated organosulfur compound. The halogenated organosulfur compound is selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts and other metal salts thereof, and mixtures thereof.

Outer core layer 320 or 430 typically is made by compression molding. Suitable vulcanization conditions include a vulcanization temperature of between about 130° C. and about 190° C. and a vulcanization time of between about 5 and about 20 minutes. To obtain the desired rubber crosslinked body for use as a layer, particularly outer core layer 320 or 430, of the golf ball described herein, the vulcanization temperature is preferably at least about 140° C.

Typically, outer core layer 430 has a surface Shore D hardness of from 50 to 60, and the surface hardness of outer core layer 430 is higher than the surface hardness of inner core layer 440.

When outer core layer 430 is produced by vulcanizing and curing the rubber composition in the above-described way, advantageous use may be made of a method in which the vulcanization step is divided into two stages: first, the outer core layer material is placed in an outer core layer-forming mold and subjected to an initial vulcanization so as to produce a pair of semi-vulcanized hemispherical cups, following which a prefabricated inner core layer is placed in one of the hemispherical cups and is covered by the other hemispherical cup, in which state complete vulcanization is carried out.

The surface of inner core layer 440 placed in the hemispherical cups may be roughened before the placement to increase adhesion between inner core layer 440 and outer core layer 430. In some embodiments, the inner core layer surface may be pre-coated with an adhesive or pre-treated with chemical(s) before placing inner core layer 440 in the hemispherical cups to enhance the durability of the golf ball and enable a high rebound.

Outer cover layer 410 of golf ball 400 typically has a thickness of from about 0.5 mm to about 2 mm. In some embodiments, outer cover layer 310 of the present disclosure has a thickness of from about 0.8 mm to about 2 mm. In some embodiments, outer cover layer 410 has a thickness of from about 1 mm to about 1.7 mm.

Typically, inner cover layer 420 may comprise a thermoplastic material. The thermoplastic material of an inner cover layer may comprise at least one of an ionomer resin, a highly neutralized acid polymer, a polyamide resin, a polyurethane resin, a polyester resin, and a combination thereof.

Some embodiments are directed to a 4-piece golf ball. In these embodiments, inner cover layer 420 may comprise the same crosslinked thermoplastic polyurethane as an outer cover layer 410 (discussed below). In some embodiments, the inner cover layer comprises an uncrosslinked thermoplastic polyurethane different from an outer cover layer, while in some embodiments, the inner cover layer comprises an entirely different type material from the outer cover layer. In some embodiments, inner cover layer 420 comprises the same material as outer cover layer 410. In some embodiments, the inner cover (intermediate) layer has a thickness less than the thickness of the outer cover layer.

In some embodiments, outer cover layer 410 comprises a cross-linked TPU elastomer including cross-links formed from allyl side chain moieties. The cross-linked TPU elastomer is polyurethane that is the reaction product of an organic isocyanate with a mixture of the following reactants:

(a) a diol having 2 primary hydroxyl groups and at least 1 pendant unsaturation having the following formula:

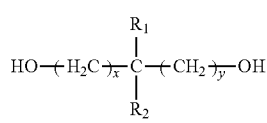

(1)

in which $R^1$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, and $R^2$ may include an allyl group; and x and y are integers independently having any value from 1 to 10;

(b) a chain extender having at least two reaction sites with isocyanates and having a molecular weight of less than about 450;

(c) a long chain polyol having a molecular weight of between about 500 and about 4,000; and (d) a sufficient amount of free radical initiator, so as to be capable of generating free radicals that induce crosslinking structures in the hard segments by free radical initiation.

The chemical groups in formula (1) may have their conventional definitions as is generally known in the art of chemistry. Specifically, an unsubstituted alkyl group includes any chemical group comprising only carbon and hydrogen linked by single bonds. A substituted alkyl group may include atoms other than carbon and hydrogen in a side chain portion, such as a halogen group, an inorganic group, or other well-known functional groups. In some embodiments, a substituted or unsubstituted alkyl group may include from 1 to about 100 carbon atoms in the alkyl chain. In other embodiments, a substituted or unsubstituted alkyl group may have from 1 to 10 carbon atoms in the alkyl chain. An alkyl group, or any portion thereof, or alkyl substituent, may be a straight chain or branched.

As is further known in the art of chemistry, an aryl group is defined as any group that includes an aromatic benzene ring. Furthermore, an alkyl-aryl group includes at least one aromatic benzene ring in addition to at least one alkyl carbon. An ether group includes at least one oxygen atom bonded to two carbon atoms. An ester group includes at least one carbon atom that is double bonded to a first oxygen atom and single bonded to a second oxygen atom, which also is bonded to a second carbon atom.

In specific embodiments, the unsaturated diol may include an allyl ether group as the side chain. For example, the unsaturated diol may be represented by formula (2) shown below:

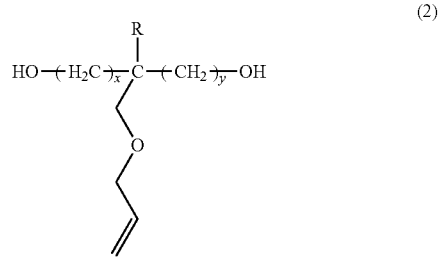

(2)

in which R is a substituted or unsubstituted alkyl group, and x and y are integers independently having values of 1 to 4. In particular embodiments, x and y may both have values of 1, 2, 3 or 4. In other embodiments, x and y may each have different values from 1 to 4.

Typically, the diol having pendant unsaturation is trimethylolpropane monoallyl ether ("TMPME"). Reference is made to applicants' co-pending U.S. application Ser. No. 12/827,360, filed Jun. 30, 2010, the entirety of which is hereby incorporated by reference.

The organic isocyanate may include any of the known aromatic, aliphatic, and cycloaliphatic di- or polyisocyanates. Examples of suitable isocyanates include: 2,2'-, 2,4'-(and particularly) 4,4-diphenylmethane diisocyanate, and isomeric mixtures thereof ("MDI"); polyphenylene polymethylene polyisocyanates (poly-MDI, PMDI); 2,4- and 2,6-toluene diisocyanates, and isomeric mixtures thereof such as an 80:20 mixture of the 2,4- and 2,6-isomers ("TDI"); isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; and the like.

Suitable optional second chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like. Minor amounts of crosslinking agents such as glycerine, trimethylolpropane, diethanolamine, and triethanolamine may be used in conjunction with the diol chain extenders.

In addition to the common diol chain extenders, diamines and amino alcohols may also be used as the optional second chain extender. Examples of suitable diamines include aliphatic, cycloaliphatic or aromatic diamines. In particular, a diamine chain extender may be ethylene diamine, hexamethylene diamine, 1,4-cyclohexyene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2-6-diethyl-aniline)). Examples of suitable amino alcohols are ethanol amine, N-methylethanolamine, N-butylethanolamine, N-oleylethanolamine, N-cyclohexylisopropanolamine, and the like. Mixtures of various types of chain extenders may also be used to form the crosslinked thermoplastic polyurethane.

The long chain polyol ("the polyol") may generally be a polyester polyol or a polyether polyol. Accordingly, the crosslinked thermoplastic polyurethane may be either general type of polyurethane: a polyether based polyurethane elastomer or a polyester based polyurethane elastomer, or mixtures thereof.

The long chain polyol may be a polyhydroxy compound having a molecular weight between 500 and 4,000. Suitable long chain polyols may generally include linear polyesters, polyethers, polycarbonates, polylactones (e.g., ϵ-caprolactone), and mixtures thereof. In addition to polyols having hydroxyl terminal groups, the polyol may include carboxyl, amino or mercapto terminal groups.

Polyester polyols are produced by the reaction of dicarboxylic acids and diols or esterifiable derivatives thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols are prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, poly-1,4-tetramethylene and polyoxyethylene glycols are also typical in the present invention.

Polycarbonate polyols are made through a condensation reaction of diols with phosgene, chloroformic acid ester, dialkyl carbonate or diallyl carbonate. Examples of diols in the suitable polycarbonate polyols of the crosslinked thermoplastic polyurethane elastomers are ethanediol, diethylene glycol, 1,3-butanediol, 1,4-butanediol, 1,6-hexanediol, neopentylglycol, and 1,5-pentanediol.

The crosslinked thermoplastic polyurethane elastomer may comprise a sufficient amount of free radical initiator so as to be capable of inducing crosslinking structures in the hard segments by free radical initiation. The free radical initiator may generate free radicals through thermal cleavage or UV radiation. When the half-life of the free radical initiator and its operation temperature are considered in the manufacturing process, the weight ratio of initiators to unsaturated diols may be from 0.1:100 to 100:100. In particular embodiments, the weight ratio of free radical initiator to unsaturated diols may be about 5:100.

A variety of known free radical initiators may be used as the radical source in order to make the present polyurethane elastomer having a crosslinking structure. Suitable radical initiators may include peroxides, sulfurs, and sulfides, and peroxides may be particularly suitable in some embodiments. The peroxides may be aliphatic peroxides, aromatic peroxides, or mixtures thereof. Peroxides such as diacetylperoxide, di-tert-butylperoxide, dicumylperoxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl)peroxide may be used as the free radical initiator in some embodiments.

In some embodiments, inner cover layer 420 has a Shore D hardness as measured on the curved surface of at least about 60, higher than the Shore D of outer cover layer 410, thus reducing spin rate on a driver shot. In some embodiments, outer cover layer 410 of golf ball 400 has a Shore D hardness as measured on the curved surface from about 45 to about 60.

To have a good spin performance for short iron shots, outer cover layer 410 has a flexural modulus less than about 1,000 psi.

Other properties may be desirable for golf ball 300 or 400. In some embodiments, it may be desirable for golf ball 300 or 400 to have a moment of inertia between about 82 g-cm$^2$ and about 90 g-cm$^2$. Such a moment of inertia may produce a desirable distance and trajectory, particularly when golf ball 300 or 400 is struck with a driver or driven against the wind.

Typically, golf ball 300 or 400 will have a compression deformation of about 2.2 mm to about 4 mm. In some embodiments, golf ball 300 or 400 has compression deformation of about 2.5 mm to about 3.5 mm. In some embodiments, golf ball 300 or 400 has compression deformation of about 2.5 mm to about 3 mm.

In some embodiments, the layers used to make golf ball 400 may have a specified relationship in terms of their respective physical properties. For example, for a greater moment of inertia, outer core layer 430 has a fourth specific gravity, and inner cover layer 420 has a fifth specific gravity, and the fifth specific gravity is greater than the fourth specific gravity.

After the cover layer is made, golf ball 300 or 400 has a dimple pattern which provides coverage of 70 percent or more. Golf ball 300 or 400 then may undergo various further processing steps such as buffing, primer coating, stamping, and top coating.

EXAMPLES

Golf balls in accordance with the present invention were fabricated as described below, and voids (bubble defects) in the inner core layer were compared to voids found in comparative examples.

For each golf ball, the masterbatch was selected from Table 1; inner core layer was made from a material selected from Table 2; the outer core layer was made from a material selected from Table 3; the inner cover (intermediate) layer (if present) was made from a material selected from Table 4; and the cover layer or outer cover layer was made from a material selected from Table 5-1 or Table 5-2. The amounts of the materials listed in Tables 1, 2, 3, 4, 5-1, and 5-2 are shown in parts by weight (pbw) or percentages by weight.

TABLE 1

| Masterbatch Materials | | |
|---|---|---|
| | A | B |
| Surlyn ® 8940 | 40 | 0 |
| Barium sulfate | 60 | 60 |
| HPF 2000 | 0 | 40 |

Surlyn® 8940 is a trade name of ionomeric resins by E. I. DuPont de Nemours and Company. HPF 2000 is a trade name of a highly neutralized acid polymer resin by E. I. DuPont de Nemours and Company. Masterbatches A and B were made using a water-cooling granulating machine.

TABLE 2

| Inner Core Layer Materials | | |
|---|---|---|
| Resin: | C | D |
| HPF 2000 | 68 | 68 |
| HPF AD 1035 | 12 | 12 |
| Masterbatch A | 20 | 0 |
| Masterbatch B | 0 | 20 |

HPF 2000 and HPF AD 1035 are trade names of highly neutralized acid polymer resins by E. I. DuPont de Nemours and Company.

TABLE 3

| Outer Core Layer Materials | | | |
|---|---|---|---|
| Rubber compound: | E | F | G |
| TAIPOL ™ BR0150 | 100 | 100 | 100 |
| Zinc diacrylate | 29 | 29 | 24 |
| Zinc oxide | 9 | 9 | 6 |
| Barium sulfate | 11 | 9 | 39.5 |
| Peroxide | 1 | 1 | 1 |

TAIPOL™ BR0150 is the trade name of a rubber produced by Taiwan Synthetic Rubber Corp.

TABLE 4

| Inner cover/Intermediate Layer Material | |
|---|---|
| Resin: | H |
| Neothane 6303D | 100 |

Neothane 6303D is the trade name of a thermoplastic polyurethane produced by Dongsung Highchem Co. LTD.

TABLE 5-1

| Cover/Outer Cover Layer Materials | |
|---|---|
| | I |
| PTMEG (pbw) | 100 |
| BG (pbw) | 15 |
| TMPME (weight % to total components) | 10% |
| DCP (weight % to total components) | 0.5% |
| MDI (pbw) | 87.8 |
| (NCO index) | 1.01 |

TABLE 5-2

| Cover/Outer Cover Layer Materials | |
|---|---|
| | J |
| Surlyn ® 8940 | 50 |
| Surlyn ® 9910 | 50 |

Surlyn® 9910 is trade name of ionomeric resin by E. I. DuPont de Nemours and Company.

"PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. Finally, "MDI" is diphenylmethane diisocyanate, commercially available from Huntsman, under the trade name of Suprasec® 1100.

Cover layer material I was formed by mixing PTMEG, BG, TMPME, DCP and MDI in the proportions shown. Specifically, these materials were prepared by mixing the components in a high agitation stir for 1 minute, starting at a temperature of about 70° C., followed by a 10-hour post curing process at a temperature of about 100° C. The post-cured polyurethane elastomers then were ground into small chips. Cover layer material J was made by blending the two Surlyn® compounds.

Six golf balls were manufactured from the above materials. The identity and amount of each layer of each ball is shown in Table 6. Examples 1 and 2 and comparative examples 4 and 5 were 4-piece golf balls, whereas example 3 and comparative example 6 were 3-piece golf balls. Generally, the golf balls were manufactured using conventional compression molding and injection molding processes known in the art of golf ball manufacturing.

After the golf balls were finished, the golf balls were cut in half and the void defects (air bubbles) in the inner core layer were identified.

TABLE 6

Golf Ball Testing Data

|  | Examples | | | Comparative examples | | |
| --- | --- | --- | --- | --- | --- | --- |
|  | 1 | 2 | 3 | 4 | 5 | 6 |
| Inner Core Layer | | | | | | |
| Material | C | C | C | D | D | D |
| Diameter (mm) | 24 | 21 | 28 | 24 | 21 | 28 |
| Shore D Hardness | 53 | 53 | 53 | 53 | 53 | 53 |
| Compression Deformation (mm) | 3.2 | 3.5 | 3.0 | 3.2 | 3.5 | 3.0 |
| COR | 0.83 | 0.83 | 0.83 | 0.83 | 0.83 | 0.83 |
| Outer Core Layer | | | | | | |
| Material | E | F | G | E | F | G |
| Thickness (mm) | 7.25 | 8.75 | 5.25 | 7.25 | 8.75 | 5.25 |
| Shore D Hardness | 59 | 58 | 51 | 59 | 58 | 51 |
| Inner Cover/-Intermediate Layer | | | | | | |
| Material | H | H | None | H | H | None |
| Thickness (mm) | 1.0 | 1.0 | X | 1.0 | 1.0 | X |
| Shore D Hardness | 69 | 68 | X | 69 | 68 | X |
| Flexural Modulus(psi) | 77,000 | 77,000 | X | 77,000 | 77,000 | X |
| Outer Cover/Cover layer | | | | | | |
| Resin | I | I | J | I | I | J |
| Thickness (mm) | 1.1 | 1.1 | 1.7 | 1.1 | 1.1 | 1.7 |
| Shore D Hardness | 53 | 53 | 69 | 53 | 53 | 69 |
| Flexural Modulus(psi) | 550 | 550 | 49,000 | 550 | 550 | 49,000 |
| Inner core layer voids (air bubbles) | No | No | No | Yes | Yes | Yes |

As shown in Table 6, voids did not form in the inner cores (Examples 1, 2, and 3) comprising an ionomer resin masterbatch, whereas voids formed in the inner core layers comprising only highly neutralized acid polymers masterbatch (Comparative examples 4, 5, and 6).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A golf ball comprising an inner core layer comprising a blend comprising a first highly neutralized acid polymer having a first Vicat softening temperature and a first specific gravity, a second highly neutralized acid polymer having a second Vicat softening temperature and a second specific gravity, and an ionomer-based masterbatch comprising an additive and an ionomer resin having a third Vicat softening temperature, an outer core layer having a thickness between about 5 mm and about 9 mm essentially enclosing the inner core layer and comprising polybutadiene rubber, and a cover layer essentially enclosing the outer core layer, wherein the absolute values of the differences among the Vicat softening temperatures is no more than about 15° C. and the absolute value of the difference between the specific gravities is no more than about 0.015.

2. The golf ball of claim 1, wherein the ionomer resin has a third specific gravity and the additive is a filler having a specific gravity greater than the first, second, and third specific gravities.

3. The golf ball of claim 2, wherein the specific gravity of the filler is greater than the sum of the first, second, and third specific gravities.

4. The golf ball of claim 3, wherein the specific gravity of the filler is greater than about 3.

5. The golf ball of claim 1, wherein the additive is a filler selected from the group consisting of zinc oxide, titanium dioxide, tin oxide, calcium oxide, magnesium oxide, barium sulfate, zinc sulfate, zinc carbonate, barium carbonate, tungsten powder, and molybdenum powder, and blends thereof.

6. The golf ball of claim 1, wherein the ionomer-based masterbatch comprises at least about 55 wt percent additive.

7. The golf ball of claim 1, wherein said inner core layer has a diameter of from 21 mm to 28 mm.

8. The golf ball of claim 1, wherein the first Vicat softening temperature is between about 48° C. and about 65° C., the second Vicat softening temperature is between about 48° C. and about 65° C., and the third Vicat softening temperature is between about 48° C. and about 65° C.

9. The golf ball of claim 8, wherein the absolute value of the difference between the first Vicat softening temperature and the second Vicat softening temperature is less than about 5° C.

10. The golf ball of claim 8, wherein the inner core layer has a surface Shore D hardness of from about 45 to about 55.

11. The golf ball of claim 8, wherein the outer core layer has a surface Shore D hardness of from about 50 to about 60 which and is higher than the surface hardness of the inner core layer.

12. The golf ball of claim 1, wherein the inner core layer has a Shore D cross-sectional hardness of from 45 to 55 at any single point on a cross-section obtained by cutting the inner core layer in half, and has a Shore D cross-sectional hardness difference between any two points on the cross-section of within ±6.

13. The golf ball of claim 1, wherein the sphere comprising the inner core layer enclosed by the outer core layer has a coefficient of restitution of at least about 0.8.

14. The golf ball of claim 1, wherein the cover layer comprises thermoplastic material selected from the group consisting of ionomer resin, highly neutralized acid polymer, polyamide resin, polyurethane resin, polyester resin, and blends thereof.

15. The golf ball of claim 1, further comprising an intermediate layer situated between the outer core layer and the cover layer.

16. The golf ball of claim 15, wherein the intermediate layer has a surface Shore D hardness of at least about 60 and the cover layer has a surface Shore D hardness of from about 45 to about 60.

17. The golf ball of claim 15, wherein said intermediate layer comprises a thermoplastic material comprising at least one of an ionomer resin, a highly neutralized acid polymer, a polyamide resin, a polyurethane resin, and a polyester resin.

18. The golf ball of claim 15, wherein said cover layer comprises a crosslinked thermoplastic polyurethane elastomer including crosslinks formed from allyl groups, and said crosslinked thermoplastic polyurethane elastomer is a reaction product formed from reacting an organic isocyanate with a mixture of the following reactants:
(a) a diol having 2 primary hydroxyl groups and at least 1 pendent unsaturation having the following formula:

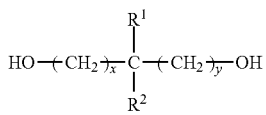

in which $R^1$ is a substituted or unsubstituted alkyl group, substituted or unsubstituted aryl group, substituted or unsubstituted alkyl-aryl group, which may optionally include an ether or ester group, or an unsaturated bond in any main chain or side chain of any group, or is H; $R^2$ is a substituted or unsubstituted alkyl group, substituted or unsubstituted aryl group, or substituted or unsubstituted alkyl-aryl group, which may optionally include an ether or ester group, and $R^2$ includes an allyl group; and x and y are integers independently having any value from 1 to 10;

(b) a chain extender having at least two reaction sites with isocyanates and having a molecular weight of less than about 450;

(c) a long chain polyol having a molecular weight of between about 500 and about 4,000; and (d) a sufficient amount of free radical initiator, so as to be capable of generating free radicals that induce crosslinking structures in the hard segments by free radical initiation.

19. The golf ball of claim 18, wherein the unsaturated diol (a) is trimethylolpropane monoallylether (TMPME).

20. The golf ball of claim 18, wherein the outer cover layer has a flexural modulus of less than 1,000 psi.

* * * * *